United States Patent [19]

Lawson et al.

[11] Patent Number: 4,502,541

[45] Date of Patent: Mar. 5, 1985

[54] STAGED PREFORMED-SURFACTANT-OPTIMIZED AQUEOUS ALKALINE FLOOD

[75] Inventors: Jimmie B. Lawson; David R. Thigpen, both of Houston, Tex.

[73] Assignee: Shell Oil Company, Houston, Tex.

[21] Appl. No.: 549,145

[22] Filed: Nov. 7, 1983

[51] Int. Cl.[3] .............................................. E21B 43/22
[52] U.S. Cl. .................................. 166/275; 166/270; 252/8.55 D
[58] Field of Search ............... 166/270, 273, 274, 275; 252/8.55 D

[56] References Cited

U.S. PATENT DOCUMENTS

| | | | |
|---|---|---|---|
| 3,493,051 | 2/1970 | Gogarty | 166/273 X |
| 3,599,716 | 8/1971 | Thompson | 166/273 |
| 3,637,018 | 1/1972 | Kelly et al. | 166/273 X |
| 3,927,716 | 12/1975 | Burdyn et al. | 166/273 X |
| 3,952,803 | 4/1976 | Kerfoot et al. | 166/273 X |
| 3,977,470 | 8/1976 | Chang | 166/273 |
| 4,008,769 | 2/1977 | Chang | 166/274 |
| 4,232,737 | 11/1980 | Tyler et al. | 166/273 |
| 4,274,488 | 6/1981 | Hedges et al. | 166/273 |
| 4,433,730 | 2/1984 | Trushenski | 166/273 X |

*Primary Examiner*—George A. Suchfield

[57] ABSTRACT

Oil is recovered from an acidic oil reservoir by injecting an alkaline, saline, aqueous solution containing proportions of preformed cosurfactant which are decreased as increasing amounts of the solution are injected.

10 Claims, 3 Drawing Figures

STAGED PREFORMED-SURFACTANT-OPTIMIZED AQUEOUS ALKALINE FLOOD

BACKGROUND OF THE INVENTION

The present invention relates to an aqueous alkaline flood process for recovering oil by injecting an aqueous alkaline solution into a subterranean oil reservoir containing an acidic oil. More particularly, the present invention relates to such a process in which decreasing proportions of preformed cosurfactant material are included in the injected solution in a manner which solves a problem unique to aqueous alkaline flood processes.

Numerous aqueous alkaline flood processes have been proposed, and various processes involving injecting an aqueous alkaline solution and various preformed surfactants have been described in U.S. patents, such as the following: U.S. Pat. No. 3,771,817 describes injecting an aqueous alkaline solution to satisfy the surfactant adsorption sites on the reservoir rock and then injecting a surfactant-containing aqueous liquid which may also contain alkali. U.S. Pat. Nos. 3,804,170; 3,804,171 and 3,847,823 describe injecting aqueous alkaline solutions containing overbased petroleum sulfonate surfactants which are formed by over-neutralizing petroleum hydrocarbon sulfonates. U.S. Pat. Nos. 3,997,470 and 4,004,638 describe injecting an aqueous alkaline solution followed by an aqueous alkaline solution which contains a preformed surfactant which can be substantially any hydrocarbon sulfonate and can be accompanied by polyphosphates and carbonates that enhance the oil displacing efficiency of the process.

U.S. Pat. No. 4,099,569 describes a staged process for recovering oil from a subterranean reservoir by injecting a surfactant solution in which the concentration of the surfactant is increased as increasing amounts of the solution are injected and then injecting a drive fluid. U.S. Pat. No. 4,232,737 describes a staged injection of a highly saline aqueous petroleum sulfonate surfactant system containing a solubilizing amount of cosurfactant and decreasing the concentration of both the salt and surfactant in stages to provide a trailing-edge salinity which is suitable for a polymer thickened aqueous drive fluid.

Commonly assigned U.S. patent application Ser. No. 411,779, filed Aug. 26, 1982 by D. R. Thigpen, J. B. Lawson and R. C. Nelson (i.e., the "'779 application") relates to recovering oil from an acidic oil reservoir by injecting an alkaline aqueous solution. In the process of the '779 application, the alkaline solution also contains a substantially neutral salt and a preformed cosurfactant. That cosurfactant comprises at least one compound which is significantly soluble in both the aqueous alkaline solution and the reservoir oil while being more soluble in the aqueous solution (relative to its solubility in the reservoir oil) than are the petroleum acid soaps which can be formed from the reservoir oil. The cosurfactant solution is selected and its concentration is adjusted so that the injected solution has an alkalinity, salinity and preformed cosurfactant content such that the salinity of the surfactant system formed by the interaction of the injected solution and the reservoir oil is substantially optimum for minimizing interfacial tension between the oil and surfactant system.

The disclosures of the '779 application are incorporated herein by reference.

As indicated in the '779 application, although prior processes in which preformed surfactants were included in injected aqueous liquid solutions were designed to improve the oil recovery efficiency of similar processes free of the preformed surfactants, a serious problem remained in either type of such prior processes. Whenever an aqueous alkaline solution is injected into an oil reservoir, some or all of the alkali may be consumed by chemical reactions other than the desired reaction of converting petroleum acids to surfactant soaps. For example, multivalent cations dissolved in the water in the reservoir and/or associated with clay or other reservoir rock materials can rapidly consume alkali by forming and precipitating multivalent metal hydroxides or salts. In siliceous reservoirs significant proportions of alkali are consumed by dissolving silicon oxide and by forming alkali metal silicates, etc. Because of such side reactions, if the injected aqueous alkaline solution is dilute, the alkali will propagate slowly through the reservoir rocks. The frontal propagation rate is slow because, as each portion of the injected solution contacts fresh portions of rock, some or all of its alkali content may be consumed by the side reactions. This is repeated over and over, and thus, although the unreactive liquid components of the injected solution may move through the reservoir at the rate corresponding to the rate at which the solution was injected, the movement through the reservoir of the alkali may be much slower. For example, it is disclosed in SPE Paper No. 8995 by Bunge et al. that, when an aqueous alkaline solution containing 0.44% sodium hydroxide and 1.0% sodium chloride was flowed through a core of Wilmington sand which initially contained 1.0% calcium chloride solution; more than two pore volumes of the aqueous alkaline solution had to be injected before any of the sodium hydroxide reached the outflow end of the core.

But it is known that, for example, as indicated in U.S. Pat. No. 3,927,716, when an aqueous alkaline solution reacts with an acidic oil, the lowest interfacial tension between the aqueous solution and the oil frequently occurs when the concentrations of the alkali and neutral salt in the aqueous alkaline solution are low and are within a rather narrow range, such as about 0.01 to 0.04% by weight of alkali and 0.5 to 2.0% netural salt. This was the problem to which the '779 application was directed. The teachings of the prior art had not disclosed how to obtain the low interfacial tension required for a good oil recovery while injecting an aqueous alkaline solution containing the high alkali concentration required for a satisfactory rate of alkali propagation within the reservoir.

Although an inclusion of a cosurfactant as described in the '779 patent application tends to adjust the salinity and cosurfactant concentration of the injected aqueous alkaline fluid to a value capable of providing an optimum salinity in the surfactant system formed by the reaction of the injected fluid with the reservoir oil, a problem still remains. The operator of the oil recovery process has no control over the concentration of the primary surfactant. At any point in the process the concentration of primary surfactant is determined by the oil-water ratio and the oil-water ratio is variable. One especially critical region is the flood front. There the oil saturation is high, but the injected slug has been diluted by the formation water. The dilution causes both the alkaline material and cosurfactant concentrations to be below their injected values. Therefore, if the alkaline slug is designed to be optimum for the residual oil-water ratio, the slug is apt to be over-optimum at the flood front. If, on the other hand, the slug is designed to be optimum at the flood front, it is apt to be under-optimum behind the flood front where oil saturations are lower.

SUMMARY OF THE INVENTION

The present invention relates to a process for recovering oil from a subterranean acidic oil reservoir. An oil displacing fluid containing at least one each of a dissolved alkaline material, a substantially neutral salt and a preformed cosurfactant material is injected into the reservoir. The composition of the injected fluid is arranged so that the initially injected portion contains a larger proportion of the preformed cosurfactant than later injected portions of the fluid. The oil displaced by the injected fluid is recovered.

DESCRIPTION OF THE PRESENT INVENTION

The present invention is, at least in part, premised on applicant's discovery that, during an alkaline flooding process, even low concentrations of base are sufficient to convert most if not all of the petroluem acids contained in typical reservoir oils to soaps. Because of this, the amount of oil recovered can be increased by initially using a concentration of cosurfactant which is high enough to compensate for surfactant dilution and, as the flood progresses, making at least one reduction in that concentration in order to compensate for the diminishing oil saturation.

Experiments were conducted to determine the pH range over which the acids in crude oils are converted to soaps and to determine the salinity requirement (optimum salinity) for various concentrations of cosurfactant at differing oil-water ratios. Results appear in FIGS. 1 and 2 and demonstrate two important aspects of cosurfactants enhanced alkaline flooding. They are:

(1) Salinity requirement (optimum salinity) depends upon the ratio of cosurfactant to petroleum soap.
(2) For reasonable oil-water ratios, even low concentrations of base, i.e. low pH's are sufficient to convert all of the petroleum acids present to soaps.

The interfacial activities of various basic aqueous solutions against various typical crude oils were estimated using an emulsion screening technique. The screening technique consisted essentially of the following steps.

(1) Crude oil was layered over an aqueous phase to produce a predetermined oil-water ratio, such as a ratio of ranging from about 1 to 10 to about 2-to-3, with time being allowed for the phases to reach temperature—equilibrium, and (2) Those mixtures were gently hand-shaken and the oil-water interfaces and appearances of the resulting emulsions are observed.

An experienced operator was found to be able to relate deformation of the oil-water interfaces and appearances of the resulting emulsions to probable interfacial tension lowering and oil recovery performance.

Figure 1:
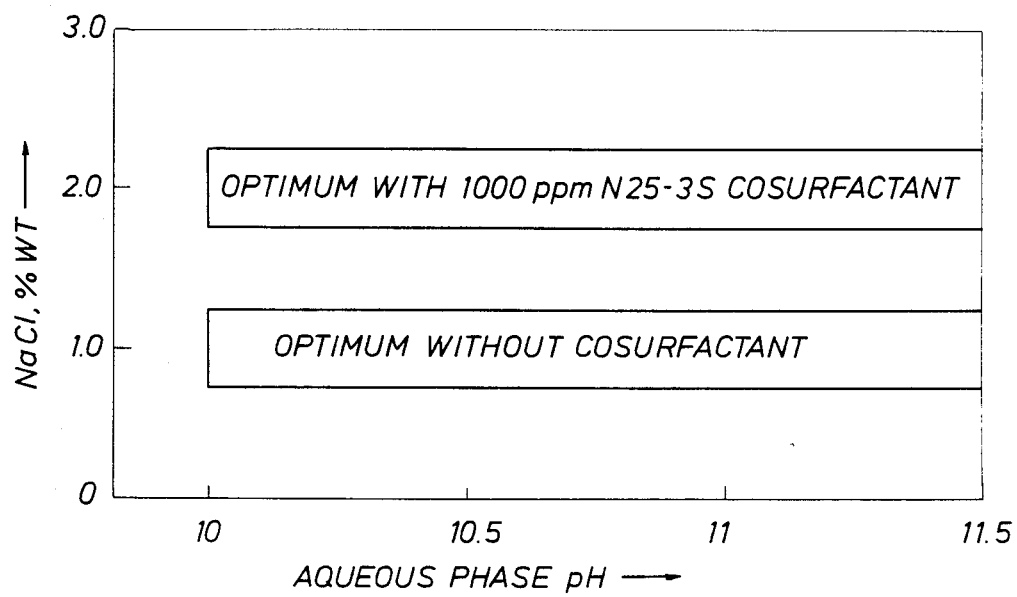
FIG. 1 shows the proportion of salt required for optimum salinities with and without cosurfactant and with increasing pH of the aqueous phase.

FIG. 1 shows the results of such tests on a particular Gulf Coast crude oil using a aqueous alkaline solution containing proportions of sodium bicarbonate and sodium hydroxide arranged to provide pH's of from about 10 to 11.5 in solutions containing from less than 1.1 to substantially 3% by weight of sodium chloride, both with and without a cosurfactant. The cosurfactant used was NEODOL 25-3S, a sulfated alkoxylated alcohol surfactant available from Shell Chemical Company. The tests were conducted at 150° F. using an oil-water ratio of 2 to 3.

As shown in FIG. 1, the optimum salinity remained the same as the pH was increased, regardless of whether the cosurfactant was present. This indicates that substantially all of the available petroleum acids were converted to soaps at all of those pH's used in the tests. Where the cosurfactant was used, the concentration of cosurfactant was kept constant. Therefore, since the oil-water ratio was constant, the surfactant-to-cosurfactant ratio would have varied with pH if there was a significant variation in the fraction of the petroleum acids which were converted to soap. If the fraction of acid converted had varied, the optimum salinity would also have varied with pH, because surfactant-to-cosurfactant ratio is a major determining factor for optimum salinity.

Figure 2:
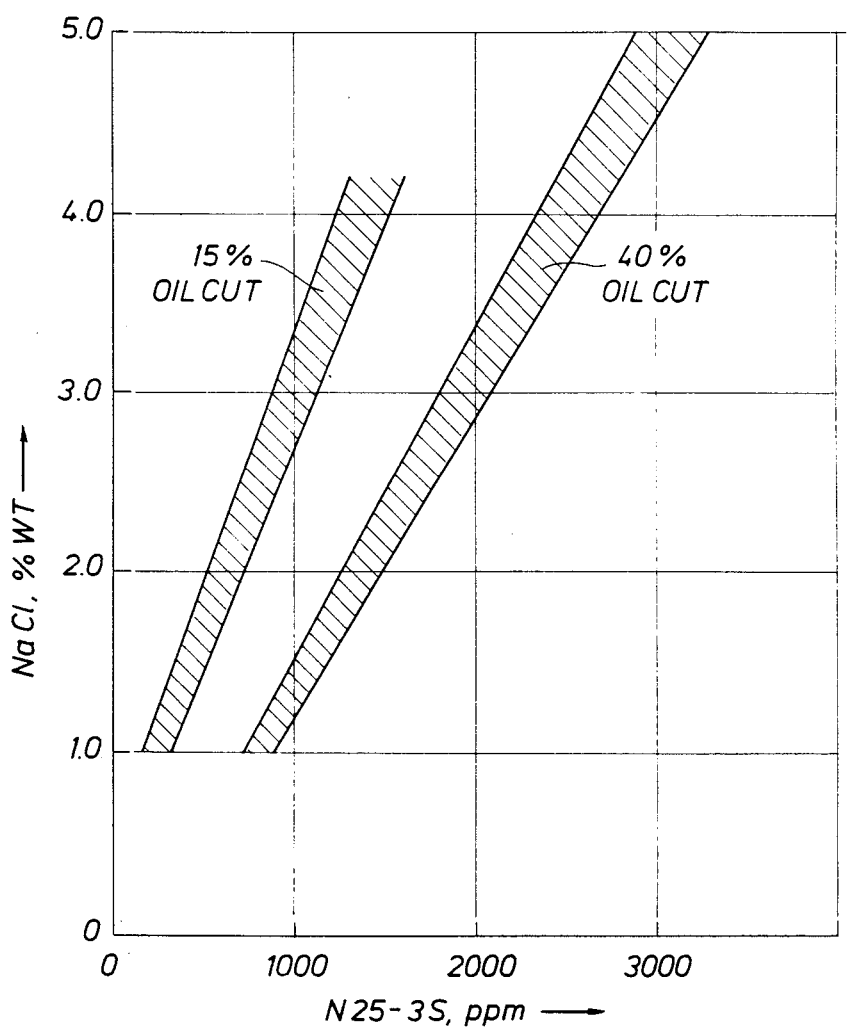
FIG. 2 shows the relationship between salt concentration and cosurfactant in contact with mixtures of typical reservoir oil and water at different oil cuts.

FIG. 2 shows optimum salinity regions for a typical Gulf Coast crude oil at alkaline water-to-oil ratios of 60-to-40 and 85-to-15 (oil cuts of 40% and 15%). The alkaline solution was a sodium carbonate—sodium bicarbonate solution containing NEODOL 25-3S cosurfactant at a pH of 10.7.

As shown in FIG. 2, for constant cosurfactant concentration, the salinity requirement depends on the oil-to-water ratio. For constant salinity, the cosurfactant requirement depends on the water-to-oil ratio. Therefore, throughout an alkaline flood oil recovery process, the water-to-oil ratio is changing and both the surfactant-to-cosurfactant ratio and the optimum salinity are changing accordingly. The especially critical region is at the flood front where the oil saturation is high. There, the alkaline slug and the cosurfactant are diluted. But, since even low levels of alkalinity are sufficient to convert substantially all of the petroleum acids in the oil to soap, the soap is present in high concentration. Thus the surfactant systems are apt to be over-optimum at the flood front and, in order to control the surfactant-to-cosurfactant ratio, the concentration of the cosurfactant should be greatest in the first injected portion, and then reduced gradually, or incrementally, in the following portions of the alkaline slug.

Oil recovery experiments were conducted in Berea sandstone cores having lengths from about 25 cm. to 90 cm. The cores were encased in epoxy resin and fiberglass. Flood temperatures were 150° F. The injection rates were adjusted to correspond to a frontal advance of 1 foot per day. Where a polymer was used for mobility control, it was pusher 700-E ("P700-E"), an emulsion of partially hydrolized polyacrylamide, available from Dow Chemical Co. The cosurfactant used was NEODOL 25-3S ("N25-3S"). The produced fluids were collected and analyzed.

Table 1 lists the results of such oil recovery experiments.

TABLE 1

| Number | wt. % N25-3S | wt. % P700-E | Other Component | PV Injected | % Sor Recovered After 1 PV | % Sor Recovered After 2 PV |
| --- | --- | --- | --- | --- | --- | --- |
| 1 | 0.2 | 0.95 | a | 2 | | 31 |
| 2 | 0.05 | | b | 2 | | 30 |
| 3 | 0.2 | | b | 2 | | 40 |
| 4 | 0.2/0.1 | | b/b | 0.15/2.0 | 29 | 44 |
| 5 | 0.2/0.075 | | b/b | 0.15/2.0 | 31 | 47 |
| 6 | 0.2/0.1 | | b/b | 0.15/1.9 | 29 | 43 |
| 7 | 0.2/0.075 | | b/b | 0.15/1.9 | 33 | 51 |
| 8 | 0.2/0.1 | | b/b | 0.15/1.9 | 27 | 40 |
| 9 | 0.2/0.1 | | b/b | 0.15/1.9 | 22 | 37 |
| 10 | 0.2/0.075 | 0.69/0.69 | b/b | 0.15/1.9 | 61 | 37 |
| 11 | 0.23/0.13 | | c/c | 0.10/1.9 | 33 | 51 |
| 12 | 0.23/0.13 | 0.70/0.70 | c/c | 0.10/1.9 | 66 | 71 | a (In wt. %) 2.65 $Na_2CO_3$, 0.21 $NaHCO_3$, 1.2 NaCl
b (In wt. %) 2.65 $Na_2CO_3$, 0.21 $NaHCO_3$, 3.0 NaCl
c (In wt. %) 2.65 $Na_2CO_3$, 0.67 $NaHCO_3$, 3.0 NaCl

Experiments 4 through 12 utilized the staged cosurfactant concentrations in accordance with the present invention. Initially, the cosurfactant concentrations were relatively high to compensate for surfactant dilutions, as flood's progressed the surfactant concentrations were reduced to compensate for declining oil saturation. The schemes were to inject the NEODOL 25-3S cosurfactant at concentrations of approximately 2,000 ppm for 0.15 pore volumes and then follow with surfactant concentrations of from 750 to 1250 ppm for the remainder of the flood. As indicated by a comparison of experiments 4 through 12 with experiments 1 through 3, the procedure of the present invention is significantly beneficial. This is true for experiments both with and without mobility control.

In general the proportion of cosurfactant in the later injected portions of the oil displacing fluid can range from about 10 to 100 percent less than the proportion in the initially injected portion of the solution.

Figure 3:
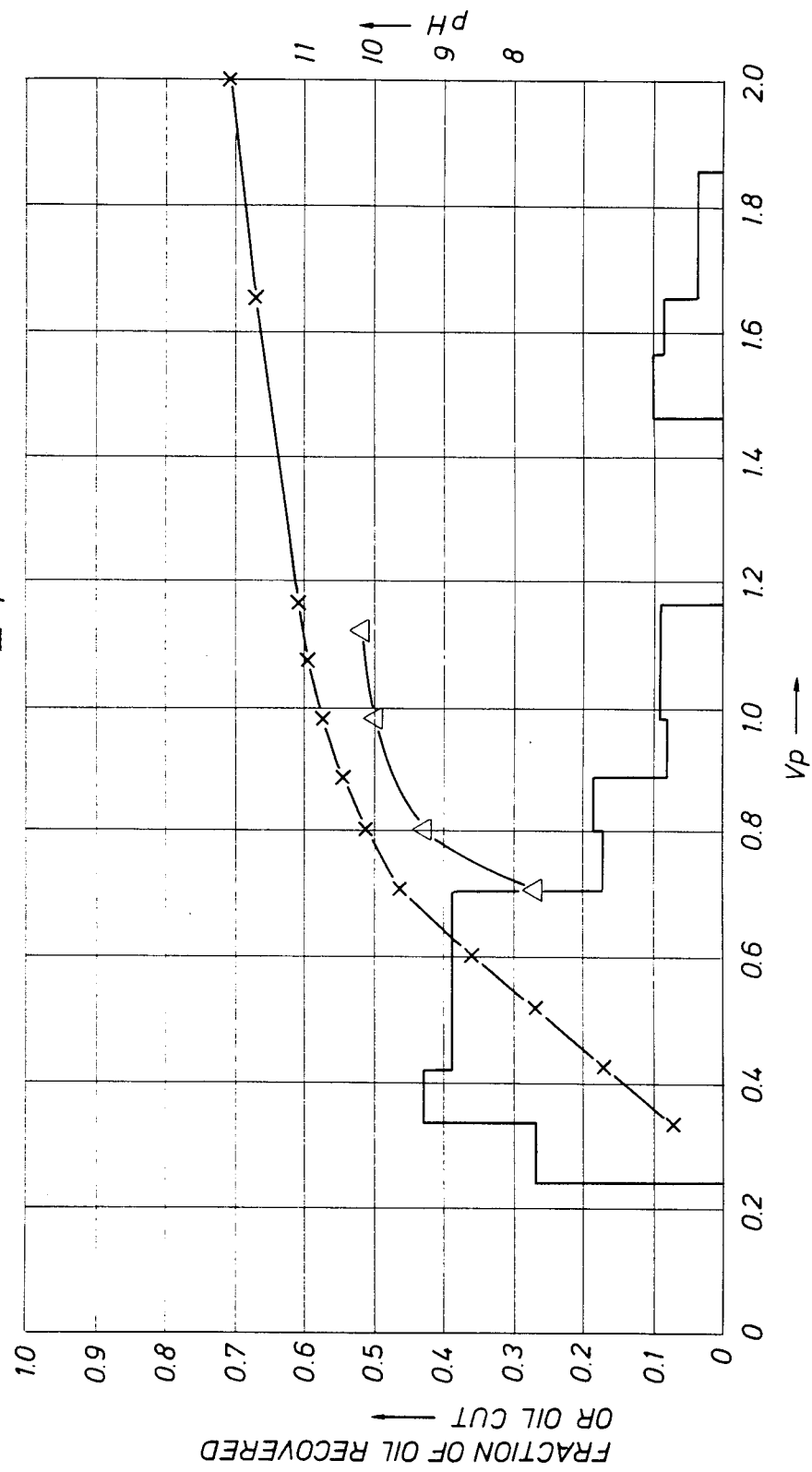
FIG. 3 shows the fraction of oil recovered, oil cut and pH of the solutions produced for amount of solution injected into an oil-containing core, in a process conducted in accordance with a preferred mode of practicing the present invention.

FIG. 3 shows the oil production history for a particular preferred embodiment of the present invention. The surfactant system used had a pH of 10.7 provided by a bicarbonate solution which was about 0.3 molar and contained 2.65 wt. % $Na_2CO_3$, 0.67 wt. % $NaHCO_5$ and 3.0 wt. % NaCl.

In general, it is most economical to design alkaline floods to work at the lowest pH possible. It is preferable that the alkaline slug be concentrated enough to restrict the lag of the high pH front to only from about 0.1 to about 0.2 pore volumes during the injection of one pore volume of the slug. Since the cation exchange capacity of berea sandstone is reported to be about 0.33 milliequivalents per 100 grams of rock and since 100 grams of berea sandstone contain about 9.5 ml. of pore space, if all of the cation exchange capacity was in the form of calcium and magnesium and if it was all converted to the sodium form on contact with the sodium carbonate-sodium bicarbonate system, then 0.33 meq. of hydroxide would be lost from 9.5 ml. of solution as a result of precipitation of calcium and magnesium hydroxide. This being the case, the carbonate-bicarbonate solutions used in the core flood shown in FIG. 3 was concentrated enough to satisfy the criterion of about 0.1 to about 0.2 pore volume retardation of the high pH front. Such flood designing is a particular preferred procedure for selecting the kind and amount of alkaline material to be used in the present process.

In the present process the aqueous alkaline solution should be arranged to provide an effectively low interfacial tension between the aqueous solution and the reservoir oil while at the same time providing a relatively high alkali concentration in order to obtain a satisfactory rate of propagation of alkali through the reservoir. This can be accomplished by injecting an aqueous alkaline solution in which the deleterious effects of a high electrolyte concentration are mitigated by the addition of a relatively small amount of a preformed cosurfactant material. And, the kind and amount of such a material which is required for a given reservoir can be determined by tests which are feasibly inexpensive and accurate.

As known, when an aqueous alkaline solution contacts a crude oil which contains a significant amount of petroleum acids, surfactants are formed in situ. Such surfactants are, essentially, soaps of the petroleum acid components of the oil and are capable of producing a low interfacial tension between the oil and an aqueous solution. How low that interfacial tension will be is affected by factors inclusive of: the temperature of the reservoir, the kind and amount of petroleum acid components contained within the reservoir oil, the kind and concentration of alkali in the alkaline solution, the kind and amount of electrolytes dissolved in the injected alkaline solution, the kind and amount of electrolytes dissolved in the water in the reservoir, the properties of the reservoir oil, and the like.

A significant increase can be provided in the "salinity requirement" of the petroleum soap surfactant system formed within the reservoir. The "salinity requirement" refers to the concentration of dissolved electrolyte, inclusive of the excess alkali and the electrolyte which becomes dissolved while the aqueous solution is in the reservoir, which minimizes the interfacial tension between the reservoir oil and the surfactant system with which the oil is being contacted. The increase in salinity requirement can be provided by dissolving in the aqueous alkaline solution to be injected a preformed cosurfactant material which is more soluble in that solution, relative to the reservoir oil, than are the petroleum soaps formed from the reservoir oil. (In other words, a preformed cosurfactant material regarding which the solubility ratio based on solubility in the aqueous alkaline solution to solubility in the oil is greater for the preformed cosurfactant material than it is for the petroleum acid soaps.) For a typical reservoir oil, such an increase in the salinity requirement can make the salinity requirement equivalent to a concentration of alkali high enough to provide a satisfactory propagation rate of alkali through the reservoir. Such an increase of the salinity requirement can be obtained without an undue increase in the cost of a waterflood oil recovery process, since the amount of preformed cosurfactant material required is small relative to the amount of preformed surfactant required for a chemical flood.

SUITABLE COMPOSITIONS AND PROCEDURES

The kind and amount of the preformed cosurfactant material used in the present process must be capable of increasing the salinity requirement of the surfactant system to be formed within the reservoir in contact with the reservoir oil and at the reservoir temperature. A convenient way to test the ability of a given material to do this is by the use of laboratory cores or sand packs and/or salinity requirement diagrams and emulsion testing procedures of the type described in SPE Paper No. 8824 by R. C. Nelson. In constructing a salinity requirement diagram the objective is to plot the midpoint salinity and the range of salinity over which the system is in a type III phase environment as a function of surfactant concentration. Tests are made using at least three surfactant concentrations ranging from that of a full strength surfactant system to about 10 or 15% of such a concentration. Typically, this may involve equilibrating 10 to 25 milliliter samples of systems which, in volume percents, are: 80% brine; 5, 2.0 and 0.8% of surfactant and 15.0, 18.0 and 19.2% of oil. For each concentration of surfactant, the brines used should cover a wide enough range of salinity to equilibrate in the II(−), III and III(+) phase environments. Sample tubes, each with a brine of different salinity are brought to temperature, shaken well, rocked periodically for a few days then allowed to stand until phase equilibrium is attained. The midpoint salinity is the level of salinity required to produce a microemulsion middle phase in which the volume fraction of oil substantially equals the volume fraction of brine. The test procedure assumes that essentially all of the surfactant is in the same phase; either a lower phase, upper phase or middle phase microemulsion. The three types of phase environment, II(−) II(+) and III are defined and further discussed in the paper by R. C. Nelson and G. A. Pope, "Phase Relationships in Chemical Flooding", SPE Journal, 1978, Pages 325–338. In terms of the salinity requirement diagram, a suitable preformed surfactant for use in the present process raises the alkali salinity requirement of the surfactant system formed by the interaction of aqueous alkali and reservoir oil by amounts which increase with increases in the concentration of preformed surfactant.

Alternatively, the attainment of a salinity requirements which is optimum for high interfacial activity can be determined by the emulsion screening tests described above and/or optimal salinity procedures based on those of a series of surfactant/cosurfactant electrolyte-/water systems which pick up about equal volumes of oil and water into a micro-emulsion phase when they are mixed with the crude oil and allowed to equilibrate, such as the tests described in U.S. Pat. Nos. 4,125,156 or 4,258,789, can suitably be used.

In general, a preformed cosurfactant suited for use in the present invention is soluble in the aqueous solution ("alkali/brine" solution) being injected into the reservoir, is an amphiphilic compound which is relatively soluble in the reservoir oil and has a solubility in the alkali/brine solution relative to its solubility in the oil which is greater than the solubility of the petroleum soaps (generated by that alkaline solution and that oil) in the alkali/brine solution relative to their solubility in the oil. Suitable preformed cosurfactants comprise amphiphilic molecules in which the polar groups are sulfates, sulfonates, nitrates, carboxylates, phosphates, phosphonates, betaines, imidazolines, alcohols, amides or the alkoxylated derivatives of amphiphilic molecules containing such polar groups. The non-polar parts of such amphiphilic molecules can be, but are not restricted to, aliphatic, aromatic or aliphatic-substituted aromatic hydrocarbon groups. Due to the low concentration of multivalent cations in aqueous alkaline solutions, amphiphilic molecules having more widely differing chemical structures may be useful as preformed surfactants in the present aqueous alkali solution than in conventional surfactant solutions, which have a substantially neutral pH. Particularly suitable preformed cosurfactants are typified by polyalkoxyalcohol sulfate surfactants such as NEODOL ® 25-3S (a polyethoxy aliphatic alcohol sulfate surfactant from Shell Chemical Company). Other preferred preformed cosurfactant compositions include aromatic ether polysulfonates, such as the Dowfax aromatic ether polysulfonate surfactants described in U.S. Pat. No. 3,945,437 by Y. C. Chiu and H. J. Hill, amyl or isopropyl alcohol, Igepon TC-42 or T-43 (sodium N-methyl-N-alkyl acid tartrate, from G.A.F.), Triton X-200 (sodium alkyl arlyl polyether sulfonate, from Rohm and Haas), Ethomed HT 15 (ethylene oxide condensates of fatty acid amides, from Armak), Aerosol OT (dialkyl ester of sodium sulfosuccinic acid, from American Cyanamid), Gafac LO529 (sodium salt of organic phosphate ester, from G.A.F.), Stepanflo (alphaolefin sulfonate surfactant, from Stepan Chemical Co.), petroleum acid soaps such as the sodium salt of Sunaptic Acid B (from Sun Chemical Co.), propoxylated ethoxylated nonionic surfactants such as those described in U.S. Pat. No. 4,293,428, amphiphilic coupling agents of the type described in U.S. Pat. No. 3,330,314 by J. Reisberg, etc.

The alkali to be used in the present process is preferably an alkali metal hydroxide, of which sodium hydroxide is particularly suitable, and/or one or more additional water-soluble basic salts which are capable of providing a pH of from about 10 to 13 when dissolved in water, such as the alkali metal carbonates and/or bicarbonates, the alkali metal silicates, phosphates, etc.

Where the well contained a silicious sand or gravel pack, or is completed into a silacious reservoir, in which silica dissolution in or around the borehole may be a problem, such as the problem in Texas and Louisiana Gulf Coast reservoir sands, a salt of the weak acid is a preferred alkali. The use of an aqueous alkaline liquid containing a sufficient proportion of dissolved silicate to reduce silicate dissolution as described in the commonly assigned copending application Ser. No. 492,319, filed May 5, 1983, by J. G. Southwick and R. C. Nelson is particularly preferred. An aqueous alkaline solution containing at least one salt of a weak acid and having a pH of from about 10 to about 13, such as a water solution of sodium carbonate and sodium bicarbonate is particularly suitable. Comparative emulsion screening tests with different Gulf Coast reservoir crude oils have indicated that various cosurfactant materials may be substantially equivalent. For example, regarding a typical crude oil, a NEODOL 25-12 polyethoxylated alaphatic alcohol available from Shell Chemical Company was found to be substantially equivalent to the NEODOL 25-3S in aqueous alkali solutions containing equal proportions of total carbonate/bicarbonate alkali.

In general, since the surfactant to cosurfactant ratio is determined by the oil water ratio, screening tests are preferably performed at different oil-water ratios, as well as various levels of cosurfactant concentration and solution salinity. Alkaline systems are preferably selected for use by estimating the most probable concentration behavior during a core flood, then choosing a cosurfactant concentration and flood salinity that is likely to maximize the time in which the petroleum acids soaps spend in an optimum electrolyte environment. In general, this amounts to selecting a concentration of cosurfactant, high enough to compensate for surfactant dilution, for use in the initial portion of the fluid. For example, a concentration of NEODOL 25-3S, in a carbonate/bicarbonate aqueous alkaline solution having a pH of from about 10.2 to 10.7, of about 2000 ppm and, after injecting in the order from about 0.15 pore volumes of the solution, following it with a solution in which the NEODOL concentration has from about 750 to 1250 ppm for the remainder of the total oil displacing slug (preferably amounting to at least about 20 to 30% of the pore volume of the swept zone of the reservoir).

Water-thickening agents suitable for use in the present invention comprise substantially any water-soluble or water-dispersable polymeric materials which (a) are capable of increasing the viscosity of the aqueous solution (while the solution is in the reservoir) to a value which exceeds that of the oil in the reservoir and (b) are substantially unreactive with the other components of the injected aqueous alkaline solution and the surfactant system it forms within the reservoir. Examples of suitable water thickeners include Xanthan gum polymers such as Xanflood QC-128 (a particularly preferred thickener, from the Kelco Chemical Co.), the Polytran water thickeners (from the Pillsbury Company), the acrylamide polymeric materials such as Pusher chemicals (from Dow Chemical Company), etc.

What is claimed is:

1. A process for recovering oil from an acidic oil reservoir comprising:
    injecting into the reservoir an oil displacing fluid consisting essentially of a substantially oil-free aqueous alkaline solution containing at least one each of a dissolved alkaline material, a substantially neutral salt and a preformed cosurfactant material;
    arranging the composition of the injected fluid so that the initially injected portion contains a larger proportion of the cosurfactant than later injected portions of the fluid; and
    recovering oil displaced by the injected fluid.

2. The process of claim 1, in which the dissolved alkaline material consists essentially of at least one alkali metal salt of a weak acid.

3. The process of claim 1, in which the proportion of cosurfactant in later injected portions of the oil displacing fluid having a cosurfactant concentration which is from about 10 to 100 percent less than that of the initially injected portion.

4. The process of claim 1, in which the dissolved alkaline material consists essentially of a mixture of alkali metal carbonates and bicarbonates.

5. The process of claim 4, in which the pH of the oil displacement fluid is from about 10 to 13.

6. The process of claim 1 in which the proportion of alkali contained in the injected oil displacing fluid is sufficient to restrict the lag of the high pH to only from about 0.1 to 0.2 pore volumes during the injection of one pore volume of the oil displacing fluid.

7. The process of claim 6, in which the dissolved alkaline material consists essentially of at least one alkali metal salt of a weak acid.

8. The process of claim 6, in which the proportion of cosurfactant in later injected portions of the oil displacing fluid having a cosurfactant concentration which is from about 10 to 100 percent less than that of the initially injected portion.

9. The process of claim 6, in which the dissolved alkaline material consists essentially of a mixture of alkali metal carbonates and bicarbonates.

10. The process of claim 9, in which the pH of the oil displacement fluid is from about 10 to 13.

* * * * *